Jan. 27, 1925.

H. A. WOLCOTT

HOSE COUPLING

Filed Dec. 17, 1923

1,524,074

Inventor
Harry A. Wolcott
By Frank E. Liverance, Jr.
Attorney

Patented Jan. 27, 1925.

1,524,074

UNITED STATES PATENT OFFICE.

HARRY A. WOLCOTT, OF HOWARD CITY, MICHIGAN, ASSIGNOR TO THOMAS H. KAIN, OF CORAL, MICHIGAN.

HOSE COUPLING.

Application filed December 17, 1923. Serial No. 681,044.

*To all whom it may concern:*

Be it known that I, HARRY A. WOLCOTT, a citizen of the United States of America, residing at Howard City, in the county of Montcalm and State of Michigan, have invented certain new and useful Improvements in Hose Couplings; and I do hereby declare the following to be a full, clear, and exact description of the invention, such as will enable others skilled in the art to which it appertains to make and use the same.

This invention relates to hose couplings and is particularly concerned with an improvement in the construction of hose coupling shown in Patent No. 1,356,126 issued October 19, 1920, the present construction having all of the advantages inherent in the construction shown by said patent and having the further advantage that as the coupling is clamped against the hose, the bolt used is shortened in its effective length instead of lengthened, making buckling of the bolt impossible, a direct tensile stress being taken by the bolt instead of one directly the opposite. At the same time, the cost of production is lessened, the bolts used being of regular stock formation and not special as in the construction referred to in said patent. Furthermore the construction is simply and economically made from sheet metal by dies at very low cost of manufacture. The invention consists in novel constructions and arrangements of parts for the effective attainment of these ends together with others not at this time specifically set forth, but which will appear as understanding of the invention is had from the following description, taken in connection with the accompanying drawing, in which, Fig. 1 is a plan view of a preferred form of construction of the hose coupling.

Like reference characters refer to like parts in the different figures of the drawing.

Figure 1:
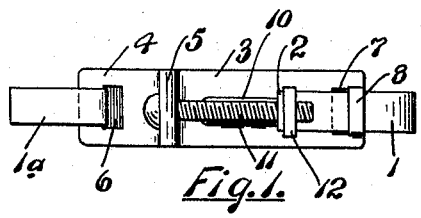
Figure 2:
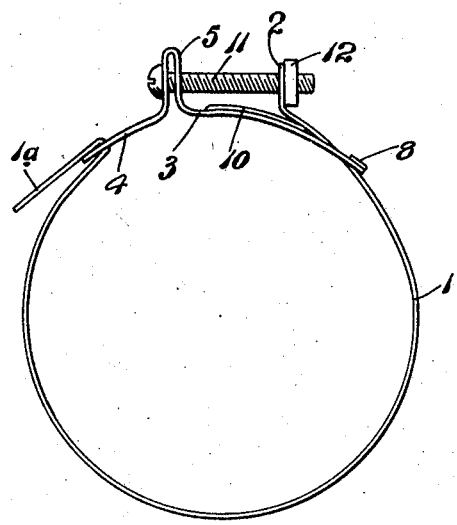
Fig. 2 is an elevation thereof.

In the preferred form, shown in Figs. 1 and 2, a relatively narrow and elongated flat strip of metal, indicated at 1, is provided which, at one end has an ear 2 turned therefrom at an angle. This forms one of the two main members of the hose coupling and is common to both modifications thereof. Associated therewith, in the preferred form is a second member of sheet metal somewhat wider than the strip 1 and formed with oppositely extending sections 3 and 4 which extend from an inverted U-shaped part 5 formed between the ends of the second member, as shown. Near the free ends of said sections 3 and 4, openings 6 and 7, respectively, are made having a width such that the strip 1 may freely pass therethrough. If desired, the metal between the openings and the ends of the sections may be pressed upwardly, as indicated at 8 and 9, the recess or depression on the under sides of said sections 3 and 4 being wide enough to receive the width of the strip 1. Also, for strength, the longer section 3 may be embossed longitudinally and between its side edges, as at 10, this, however, being no essential feature of the invention.

The end of the strip 1 having the ear 2 thereon is passed through the opening 7 in the section 3, as shown, whereby the ear 2 is brought into substantial parallelism with the part 5. Openings being made through the ear 2 and the legs of the U-shaped part 5 in alinement, a stove bolt 11 is passed therethrough, the head thereof coming against the part 5, and a nut 12 is threaded on to the end of the bolt against the ear 2. The position of the bolt may be reversed without changing the action in any respect.

The couplings are assembled as above described and shipped to the place of use. When used it is merely necessary to place the coupling around the hose with which it is to be used, and pass the free end of the strip 1 through the opening 6, allowing the end portion to pass through as far as it will go, or pulling the same through as far as possible by hand or with pliers, then bending the part extending through the opening back in a reverse direction, the end portion 1ª, as shown, being left to remain or cut off as to excess if desired. Then the bolt is tightened until the coupling securely grips the hose around which it is placed. This is a very convenient and simple method of attachment, the user not having to thread the nut on to the bolt at any time in the process. Also the coupling is practically of universal application for all standard sizes of hose, it being merely necessary to draw the portion 1ª through farther for smaller sizes of hose than for the larger sizes.

Figure 4:
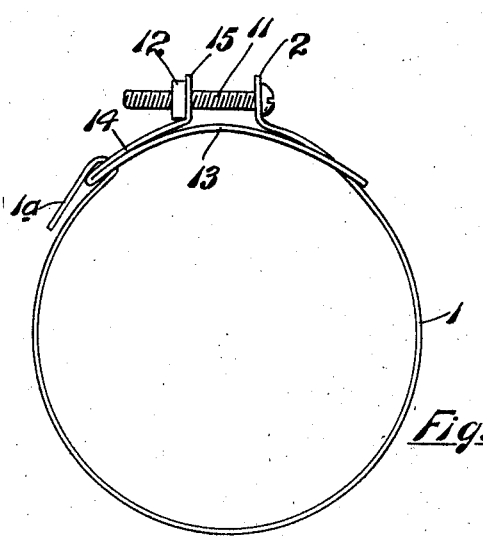
Fig. 4 is a view similar to that shown in Fig. 2, of a modification in structure of the coupling.
Figure 3:
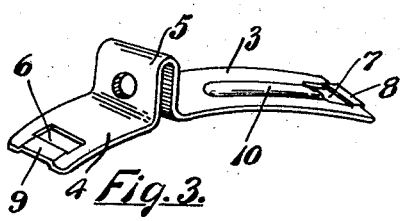
Fig. 3 is a perspective view of one of the two parts used in making the coupling.

In Fig. 4, a somewhat modified form of structure is shown. The strip 1 with ear 2 is the same. The other member is made from a single piece of sheet metal having a section 13, at one end bent back upon itself for a distance, as at 14 and then turned upward to make an ear which lies in parallelism with the ear 2 after the end of strip 1 carrying said ear has been passed through an opening similar to opening 7 in the end of the section 13. The bolt 11 with nut 12 is used to connect the parts, passing through ears 2 and 15. In using the coupling, the free end portion of the strip 1 is passed through openings made in the opposite end of the section 13 and the overlying part 14 and is bent back in the same manner as before described. This construction is not as good as the first from a manufacturing standpoint, requiring more expensive dies and being more costly to manufacture. Otherwise there is no difference in the two constructions in so far as functions performed are concerned.

I claim:

1. A hose coupling, comprising one member or sheet metal formed with an opening therethrough adjacent each end and between its ends with an outwardly projecting U-shaped portion, a second member of relatively narrow and elongated shape, formed at one end with an outturned ear, said end of the second member being passed through one of the openings in the first member so that the ear is brought into substantial parallelism with said U-shaped portion, and a bolt passing through the U-shaped portion and ear and having a nut at its end threaded thereon, substantially as and for the purposes described.

2. A hose coupling, comprising a relatively short member formed from sheet metal and having an opening in each end portion thereof, a second member of sheet metal narrower than the first member and much longer than the first member formed at one end with an outturned ear, said end of said second member and the ear thereon being passed through one of the openings in the first member, means projecting outward from the first member between the ends thereof to lie in substantial parallelism with the ear on the second member, and a bolt passing through said means and ear for drawing the same toward each other, substantially as described.

3. A hose coupling, comprising two members of sheet metal, one of said members being wider and shorter than the other and having an opening therethrough adjacent each end thereof and provided between its ends with an outwardly projecting part, said other member being formed with an outwardly turned ear at one end, said end of the other member and the ear thereon being passed through one of said openings to bring the ear into substantial parallelism with said outwardly projecting part on the first member, and means for connecting said ear and part whereby the same may be drawn toward each other.

4. A hose coupling, comprising two integral members, one of said members having an opening therein adjacent each end and the other of said members having one end passing through one of said openings, means on said end of said other member and means on the first member extending outwardly in substantial parallelism to each other, and a bolt passing through both of said means to connect the same and adapted to draw them toward each other.

5. A hose coupling, comprising two members, the first of said members being wider and shorter than the second member and formed with an opening adjacent each end with the metal between each opening the end of the member adjacent the opening being pressed outwardly to form a recess on the inner side of the member at each end thereof, said second member having an outwardly turned ear at one end which is passed through one of said openings in the first member; the said second member seating in the recess, means projecting outwardly from the first member in substantial parallelism with the ear, and a bolt to pass through said means and ear to connect the same and draw them toward each other.

6. A hose coupling, comprising two integral members of sheet metal, one being wider and shorter than the other and having openings one adjacent each end thereof, said other member at one end passing through one of the openings, means for adjustably connecting said first member with said end of the other member, the opposite end of the other member passing through the other opening in the first member and being bent back upon itself, substantially as described.

In testimony whereof I affix my signature.

HARRY A. WOLCOTT.